(12) United States Patent
Fontaine et al.

(10) Patent No.: US 10,187,925 B2
(45) Date of Patent: Jan. 22, 2019

(54) WIFI DISPLAY COMPATIBLE NETWORK GATEWAY

(71) Applicant: THOMSON LICENSING, Issy de Moulineaux (FR)

(72) Inventors: Patrick Fontaine, Rennes (FR); Ludovic Jeanne, Montreuil sur Ille (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 14/305,475

(22) Filed: Jun. 16, 2014

(65) Prior Publication Data
US 2014/0372558 A1    Dec. 18, 2014

(30) Foreign Application Priority Data
Jun. 17, 2013 (FR) ...................... 13 55670

(51) Int. Cl.
*G06F 15/16* (2006.01)
*H04W 80/00* (2009.01)
(Continued)

(52) U.S. Cl.
CPC ......... *H04W 80/00* (2013.01); *H04L 12/2836* (2013.01); *H04L 12/2838* (2013.01); *H04L 61/2582* (2013.01); *H04L 2012/2841* (2013.01)

(58) Field of Classification Search
USPC ....................................................... 709/208
See application file for complete search history.

(56) References Cited

U.S. PATENT DOCUMENTS 7,103,668 B1 * 9/2006 Corley .............. H04L 29/06027
709/231
7,170,857 B2 * 1/2007 Stephens ................. H04L 29/06
370/230
(Continued)

FOREIGN PATENT DOCUMENTS

CN         1545781 A       11/2004
CN         102566558        7/2012
(Continued)

OTHER PUBLICATIONS

Lawler, R., Roku unveils Streaming Stick, squeezes box into MHL dongle, Jan. 4, 2012, Engadget, pp. 1-3.*
(Continued)

*Primary Examiner* — Alicia Baturay
(74) *Attorney, Agent, or Firm* — Myers Wolin LLC (57) ABSTRACT

The invention relates to a method and a device for interconnection in a network gateway comprising a first wireless communication interface and a second interface adapted to the implementation of content sharing operations using an interoperability protocol, the method comprising steps of transmission, by the first interface, of at least one information element aiming to enable the gateway to be detected by a remote equipment as being compatible with a function for reproduction using a wireless communication interface, of reception of data frames defined in a link layer of a wireless network protocol, the data frames comprising an item of audiovisual content and being received from a second remote device connected to the first interface by means of a wireless connection and of transmission of the content received at said second interface to a reproduction device.

17 Claims, 3 Drawing Sheets

(51) Int. Cl.
*H04L 29/12* (2006.01)
*H04L 12/28* (2006.01)

(56) References Cited

U.S. PATENT DOCUMENTS

| | | | | |
|---|---|---|---|---|
| 7,603,697 | B1* | 10/2009 | Kupsh | H04L 51/38 380/247 |
| 8,285,851 | B2* | 10/2012 | Robbin | H04L 65/60 707/610 |
| 8,332,897 | B1* | 12/2012 | Rowe | H04N 21/4782 345/2.3 |
| 8,554,938 | B2* | 10/2013 | Mittal | G06F 17/30899 709/230 |
| 8,681,866 | B1* | 3/2014 | Jia | H04N 19/159 375/240.01 |
| 8,738,826 | B2* | 5/2014 | Stahl | G06F 3/1431 710/62 |
| 8,780,976 | B1* | 7/2014 | Jia | H04N 19/176 375/240.02 |
| 8,780,987 | B1* | 7/2014 | Jia | H04N 19/172 375/240.02 |
| 8,788,578 | B2* | 7/2014 | Wood | H04L 65/4069 463/42 |
| 8,850,052 | B2* | 9/2014 | Rosenblatt | H04L 12/2812 709/212 |
| 8,930,492 | B2* | 1/2015 | Brown | H04L 67/02 709/203 |
| 8,959,562 | B2* | 2/2015 | Garner | H04N 21/4126 348/158 |
| 9,008,177 | B2* | 4/2015 | Rabii | G06F 3/1454 375/240.12 |
| 9,037,908 | B1* | 5/2015 | Rhu | H04N 21/41422 714/25 |
| 9,131,260 | B2* | 9/2015 | Klarke | H04N 21/4221 |
| 9,144,094 | B2* | 9/2015 | Bhamidipati | H04N 21/42207 |
| 9,154,534 | B1* | 10/2015 | Gayles | H04L 65/60 |
| 9,207,903 | B2* | 12/2015 | Stahl | G06F 3/1431 |
| 9,280,263 | B2* | 3/2016 | Kim | G06F 3/0482 |
| 9,282,148 | B2* | 3/2016 | Krishnakumar | H04L 67/104 |
| 9,286,142 | B2* | 3/2016 | Cucu | G06F 9/541 |
| 9,286,854 | B2* | 3/2016 | Klarke | H04N 21/6125 |
| 9,306,992 | B2* | 4/2016 | Praveenkumar | H04L 69/24 |
| 9,473,940 | B2* | 10/2016 | Wong | H04L 63/0876 |
| 9,552,187 | B2* | 1/2017 | Stahl | G06F 3/1431 |
| 9,667,630 | B2* | 5/2017 | Wong | H04N 63/0876 |
| 2003/0055867 | A1* | 3/2003 | King | H04L 67/2861 709/201 |
| 2004/0066757 | A1* | 4/2004 | Molteni | H04L 41/048 370/329 |
| 2004/0246992 | A1 | 12/2004 | Henry et al. | |
| 2007/0101024 | A1 | 5/2007 | Doumuki et al. | |
| 2007/0250870 | A1* | 10/2007 | Kim | H04N 21/43615 725/81 |
| 2009/0219441 | A1* | 9/2009 | Kurita | G06F 3/1431 348/571 |
| 2009/0235170 | A1* | 9/2009 | Golden | G06F 3/14 715/719 |
| 2010/0011285 | A1* | 1/2010 | Kawata | G06F 3/0481 715/246 |
| 2010/0138780 | A1* | 6/2010 | Marano | G06F 3/1415 715/804 |
| 2010/0241699 | A1* | 9/2010 | Muthukumarasamy | G06F 17/30035 709/203 |
| 2010/0299436 | A1* | 11/2010 | Khalid | G06F 1/1643 709/226 |
| 2010/0302141 | A1* | 12/2010 | Shankar | G06F 3/1454 345/156 |
| 2011/0032334 | A1* | 2/2011 | Raveendran | H04N 21/816 348/46 |
| 2011/0032338 | A1* | 2/2011 | Raveendran | H04N 21/816 348/51 |
| 2011/0107388 | A1 | 5/2011 | Lee et al. | |
| 2011/0149806 | A1 | 6/2011 | Verma et al. | |
| 2011/0283334 | A1 | 11/2011 | Choi et al. | |
| 2012/0030584 | A1* | 2/2012 | Bian | G06F 9/451 715/746 |
| 2012/0032783 | A1* | 2/2012 | Ahn | G06F 3/1423 340/6.1 |
| 2012/0042275 | A1* | 2/2012 | Neerudu | G06F 3/1454 715/781 |
| 2012/0072609 | A1* | 3/2012 | Rajamani | H04N 21/4122 709/231 |
| 2012/0086563 | A1* | 4/2012 | Arling | G06F 3/0486 340/12.52 |
| 2012/0092277 | A1* | 4/2012 | Momchilov | G06F 3/038 345/173 |
| 2012/0176396 | A1* | 7/2012 | Harper | G06F 3/1431 345/589 |
| 2012/0183307 | A1 | 7/2012 | Law et al. | |
| 2012/0243524 | A1 | 9/2012 | Verma et al. | |
| 2012/0297090 | A1* | 11/2012 | Manges | G06F 3/1454 709/248 |
| 2012/0306737 | A1* | 12/2012 | Sweet | G06F 3/1454 345/156 |
| 2012/0306926 | A1* | 12/2012 | Millet | G06T 3/4007 345/660 |
| 2012/0307141 | A1* | 12/2012 | Millet | G06F 3/1431 348/441 |
| 2013/0091529 | A1 | 4/2013 | Hasegawa et al. | |
| 2013/0094423 | A1* | 4/2013 | Wengrovitz | H04L 12/1836 370/312 |
| 2013/0107119 | A1* | 5/2013 | Chang | H04M 1/72527 348/552 |
| 2013/0111537 | A1* | 5/2013 | Klarke | H04N 21/4183 725/110 |
| 2013/0124740 | A1* | 5/2013 | Liansky | G06F 15/16 709/228 |
| 2013/0147900 | A1* | 6/2013 | Weiser | H04N 7/152 348/14.08 |
| 2013/0147901 | A1* | 6/2013 | Weiser | H04L 65/1006 348/14.08 |
| 2013/0147903 | A1* | 6/2013 | Weiser | H04M 3/567 348/14.08 |
| 2013/0147906 | A1* | 6/2013 | Weiser | H04N 7/155 348/14.09 |
| 2013/0151623 | A1* | 6/2013 | Weiser | H04N 7/147 709/205 |
| 2013/0152153 | A1* | 6/2013 | Weiser | H04L 63/0236 726/1 |
| 2013/0188097 | A1* | 7/2013 | Smith | H04N 5/00 348/720 |
| 2013/0198298 | A1* | 8/2013 | Li | H04N 21/41407 709/206 |
| 2013/0219072 | A1* | 8/2013 | Han | H04L 65/60 709/228 |
| 2013/0262997 | A1* | 10/2013 | Markworth | G06Q 50/01 715/716 |
| 2013/0309648 | A1* | 11/2013 | Park | G09B 5/00 434/350 |
| 2013/0328747 | A1* | 12/2013 | Yoneda | G06F 3/1423 345/3.1 |
| 2013/0346562 | A1* | 12/2013 | Kim | H04L 65/608 709/219 |
| 2014/0040364 | A1* | 2/2014 | Baldwin | H04L 65/605 709/204 |
| 2014/0040493 | A1* | 2/2014 | Baldwin | H04L 45/24 709/231 |
| 2014/0052872 | A1* | 2/2014 | Varoglu | H04L 65/4084 709/231 |
| 2014/0104137 | A1* | 4/2014 | Brown | G06F 3/1423 345/1.1 |
| 2014/0104138 | A1* | 4/2014 | Brown | G06F 3/1423 345/1.1 |
| 2014/0112636 | A1* | 4/2014 | Huang | H04W 4/00 386/230 |
| 2014/0122656 | A1* | 5/2014 | Baldwin | H04L 65/4084 709/219 |

(56) References Cited

U.S. PATENT DOCUMENTS

| | | | |
|---|---|---|---|
| 2014/0125554 A1* | 5/2014 | Pan | G06T 3/40 345/2.2 |
| 2014/0141721 A1* | 5/2014 | Kim | H04M 1/7253 455/41.2 |
| 2014/0143672 A1* | 5/2014 | Kim | G06F 17/30861 715/733 |
| 2014/0179423 A1* | 6/2014 | Deng | A63F 13/355 463/31 |
| 2014/0215356 A1* | 7/2014 | Brander | H04L 67/36 715/753 |
| 2014/0218289 A1* | 8/2014 | Dai | H04M 1/72533 345/157 |
| 2014/0229433 A1 | 8/2014 | Nakajima et al. | |
| 2014/0269646 A1* | 9/2014 | Ramasamy | H04W 76/023 370/338 |
| 2014/0306865 A1* | 10/2014 | Pan | G06F 3/1423 345/2.1 |
| 2014/0331263 A1* | 11/2014 | Smadi | H04N 21/4126 725/81 |
| 2014/0358990 A1* | 12/2014 | Huang | H04L 67/42 709/203 |
| 2014/0359477 A1* | 12/2014 | Chen | H04L 67/1095 715/748 |
| 2014/0365567 A1* | 12/2014 | Krishnakumar | H04L 67/104 709/204 |
| 2014/0365611 A1* | 12/2014 | Praveenkumar | H04L 69/24 709/219 |
| 2015/0074511 A1* | 3/2015 | Wang | H04N 21/41407 715/234 |
| 2015/0109582 A1* | 4/2015 | Rodriguez, Jr. | H04N 5/63 353/15 |
| 2015/0248870 A1* | 9/2015 | Nagano | G09G 5/377 345/619 |
| 2015/0326941 A1* | 11/2015 | Gao | H04N 21/43635 725/74 |
| 2016/0080708 A1* | 3/2016 | Urata | H04N 9/3147 348/744 |
| 2016/0092154 A1* | 3/2016 | Bourlier | G06F 3/1454 345/2.2 |
| 2016/0173659 A1* | 6/2016 | Sheu | H04L 61/1511 709/230 |
| 2016/0173937 A1* | 6/2016 | Shih | H04N 21/43615 725/37 |
| 2016/0182585 A1* | 6/2016 | McRae | H04N 21/42684 709/219 |
| 2016/0286265 A1* | 9/2016 | Watson | H04N 21/43615 |
| 2016/0309211 A1* | 10/2016 | Grasset | G11B 27/034 |
| 2017/0034559 A1* | 2/2017 | Garner | H04N 21/4126 |
| 2017/0034560 A1* | 2/2017 | Garner | H04N 21/4126 |

FOREIGN PATENT DOCUMENTS

| | | |
|---|---|---|
| EP | 1286501 | 2/2003 |
| GB | 2483092 | 2/2012 |
| JP | 2011199567 A2 | 10/2011 |
| JP | 2011211352 A2 | 10/2011 |
| JP | 2012514416 A | 6/2012 |
| JP | 2012150474 A | 8/2012 |
| JP | 2012175452 | 9/2012 |
| JP | 2013511236 A | 3/2013 |
| JP | 2013085052 A | 5/2013 |
| JP | 2013090125 A | 5/2013 |
| WO | 2010077255 A1 | 7/2010 |
| WO | 2013/019267 A1 | 2/2013 |
| WO | 2013/056031 A1 | 4/2013 |

OTHER PUBLICATIONS

Murph, D., Always Innovating HDMI Dongle Brings Android to Your 'dumb TV' (video), Jan. 7, 2012, Engadget, pp. 1-2.*

Tanaka et al., "Everything Can Be Connected! Wi-Fi Utilization Encyclopedia," Nikkei PC21, May 2012 issue, Special Supplement, Nikkei Business Publications, Inc., Mar. 24, 2012, vol. 17, No. 7, p. 86-95.

Notice of Reason for Rejection issued by the Japan Patent Office for corresponding Japanese Patent Application No. 2014-123405, dated May 8, 2018, with an English translation.

First Office Action issued by the State Intellectual Property Office of China for corresponding Chinese Patent Application No. 201410270519.1, dated Jun. 5, 2018.

* cited by examiner

WIFI DISPLAY COMPATIBLE NETWORK GATEWAY

This application claims the benefit, under 35 U.S.C. §119 of French Patent Application 1355670, filed Jun. 17, 2013.

1. FIELD OF THE INVENTION

The invention relates to the emulation of a function for display forwarding (or for screen mirroring) via a wireless communication interface, to an item of equipment incompatible with this type of function.

2. BACKGROUND ART

Many items of electronic equipment are suitable for incorporating in local computer networks (home networks or otherwise) and participating, with other connected equipments, in the implementation of functions made available for the user.

Portable electronic devices, with their reduced dimensions, now enable significant mobility. The user can thus take them everywhere. The evolution of technologies specific to screens is such that images are now of very good quality on screens of reduced dimensions such as those available on audiovisual reproduction devices such as portable players, tablets, laptop computers and smartphones, for example.

The latest technologies used in making screens also enable access to large reproduction surfaces for fixed (non-portable) reproduction devices, such as television sets or monitors, for example.

According to usage and where he is, the user is therefore led to prefer to view an item of content on a mobile device, comprising a display of reduced dimensions, or a fixed device, comprising a display of large dimensions, better adapted to the visual comfort of the user, during the reproduction (the display) of the content.

Thus, a smartphone or a tablet appears well adapted to viewing an item of content when on the move, in a car or in public transport, and viewing on a large screen will very often be preferred for viewing a film at home, for example.

Recently, a feature has enabled the user to control, in a simple way, the reproduction of an item of audiovisual content available on an item of portable equipment by a fixed device and/or a device of larger dimensions by using a wireless connection. This operation will be called "display forwarding" in the remainder of the present document. Thus, an item of content captured (saved) using a portable device can easily and quickly be displayed by a reproduction device of larger (display) dimension when the two devices are close and both compatible with the connection technology used.

Thus the standardised WiFi Display technology, also known under the name of Miracast, enables a device of smartphone type to display its local content (that is to say saved in the internal memory) on a remote reproduction device, by means of a wireless connection. The WiFi Display and Miracast technologies both being built from the WiFi Direct technology.

Other proprietary solutions also exist and provide the user with the same features, such as, for example Air Play from the firm Apple, WiDi from the firm Intel and mirrorop.

In the paragraphs which follow, the "WiFi Display" function is described as a function for display forwarding by wireless peer-to-peer connection based on WiFi Direct and in a similar manner to Bluetooth technology enabling the broadcast of compressed audiovisual content to a remote item of equipment. "WiFi Display standard" will be used to denote the set of protocol elements defined in WiFi Direct and those specified in "WiFi Display" enabling the implementation of the functions of display forwarding as supported by the standard named Miracast. "WiFi Direct", also called "WiDi" is a standard enabling two items of equipment to be directly connected to each other by WiFi link, without using an access point. The display forwarding function according to WiFi Display requires that both devices concerned are compatible.

WiFi Direct (WiDi) which serves as a medium for WiFi Display is itself defined by the "WiFi Alliance" as a certification or compatibility mark for the direct peer-to-peer WiFi connection function as described by the manufacturers' alliance "WiFi Alliance".

Sometimes a user has an item of portable equipment which is compatible with WiFi Display technology but his other home reproduction equipment (in fact considered as fixed) is not. The advantages afforded by these user-friendly display technologies are not available to the user, except by acquiring new devices, this time compatible with a display technology such as WiFi Display. This may appear expensive to the user. Another solution consists in using a "dongle" device (a small peripheral device connected to a communication port) connected to a reproduction device. The "dongle" is configured to receive content according to the WiFi Display standard and to transfer the content to the reproduction device via a link such as, for example, an HDMI (High Definition Multimedia Interface) digital audio/video interface. This therefore involves the acquisition of a specific item of equipment and in fact incurs an additional cost.

Many display devices are equipped to be connected to a local network, even though they are not compatible with the recent technologies for broadcasting content via wireless connection, and are also compatible with content sharing standards, such as for example UPnP (Universal Plug and Play)/DLNA (Digital Living Network Alliance).

3. SUMMARY

The invention enables the situation to be improved by proposing a method and a device implementing the user-friendly feature of connection and display via wireless connection (the function referred to here as display forwarding), such as for example, WiFi Display, between a compatible item of equipment and an incompatible item of equipment, in a local network comprising a network gateway.

According to the invention, the gateway of the local network cleverly passes itself off as an audiovisual content reproduction device compatible with the WiFi Display (Miracast) standard even if it does not comprise its own means for reproducing audiovisual content. In fact, in some embodiments, the gateway comprises neither a baseband audiovisual signal output interface nor decoding means. The baseband here being principally defined by a kind of audio/video signals not requiring decompression operations before display. Still according to the invention, the gateway carries out a transfer of audiovisual content from a WiFi Display compatible transmitter device to a device incompatible with WiFi Display, enabling the latter to be seen by the compatible transmitter device as compatible and to reproduce an item of audiovisual content from the transmitter device, via the intermediary of the gateway which works as a relay (or proxy).

More specifically, the invention relates to an interconnection device for a local network comprising a first interface and a second interface, the first interface being adapted to the implementation of wireless communication and the second interface being adapted to the implementation of content sharing operations, as defined in an interoperability protocol, notably a standard, for local networks. According to an embodiment of the invention, the interconnection device comprises:

- a first transmission module, configured to transmit at least one information element aiming to enable said device to be detected by a remote equipment as being compatible with a function for reproduction using a wireless connection interface,
- a reception module, configured to receive data frames defined in a link layer of a wireless network protocol, said data frames comprising data coding an item of audiovisual content and being received from a second remote device connected to said reception module by means of a wireless connection, for example via the first interface,
- a second transmission module, configured to transmit said audiovisual content received in said data frames received from said second remote device so that the content received from said second device is displayed (reproduced) by a third device connected to said transmission module by the implementation of functions defined in said interoperability protocol adapted to sharing content between equipments connected to a same local network.

According to an embodiment of the invention, said interoperability protocol for local networks implemented by said interconnection device for a local network is defined according to the UPnP/DLNA standard or a revision of this standard.

According to an embodiment of the invention, the link layer of the wireless network protocol used is the MAC layer.

According to an embodiment of the invention, the at least one information element aiming to enable the gateway to be detected by a remote equipment as being compatible with a function for reproduction using a wireless connection interface is defined in a features declaration service comprised in a peer-to-peer wireless communication standard, for example the WiFi Direct standard.

According to an embodiment of the invention, the at least one information element aiming to enable the gateway to be detected by a remote item of equipment as being compatible with a function for reproduction using a wireless connection interface is an IE (Information Element) of the MAC network layer, as defined in a peer-to-peer wireless communication standard, such as the WiFi Direct standard or a revision of this standard.

According to an embodiment of the invention, the function for reproduction using a wireless connection interface is defined in a standard for display forwarding via a wireless communication interface, such as the WiFi Display standard or a revision of this standard.

The invention also relates to an interconnection method for a local network, in a network gateway device for local networks, the gateway comprising a first interface and a second interface, the first interface being adapted to the implementation of wireless communication and the second interface being adapted to the implementation of content sharing operations, as defined in an interoperability protocol, notably a standard protocol, for local networks. According to an embodiment of the invention, the method comprises steps of:

- transmission, by the first interface, of at least one information element aiming to enable the network gateway to be detected by a remote equipment as being compatible with a function for reproduction using a wireless connection interface,
- reception of data frames defined in a link layer of a wireless network protocol, the data frames comprising data coding an item of audiovisual content and being received from a second remote device connected to the first interface by means of a wireless connection,
- transmission of the content received in the frames received, from the remote equipment to the second interface, so that the content received from the second device is displayed (or reproduced) by a third device connected to the second interface by the implementation of functions defined in the interoperability protocol adapted to sharing content between equipment connected to a same local network.

According to an embodiment of the invention, the interconnection method for a local network, in the network gateway device for local networks, implements an interoperability protocol for local networks defined in the UPnP/DLNA standard or a revision of this standard.

According to an embodiment of the invention, the link layer of a wireless network protocol used by the first interface is the MAC layer and the information element aiming to enable the gateway to be detected by a remote equipment as being compatible with a function for reproduction using a wireless connection interface is defined in a features declaration service comprised in a peer-to-peer wireless communication standard, such as the WiFi Direct standard.

According to an embodiment of the invention, the function for reproduction using a wireless connection interface is defined in a standard for display forwarding via a wireless communication interface, such as the WiFi Display standard or a revision of this standard.

According to an embodiment of the invention, the step of transmission of the content comprises a prior step of adaptation of the format of the data and/or a step of transcoding the audiovisual content.

According to an embodiment of the invention, the prior step of adaptation of the format of the data corresponds to a transition from a format compatible with a standard for display forwarding via a wireless communication interface, such as the WiFi Display standard, to a format compatible with the UPnP/DLNA standard.

According to an embodiment of the invention, the prior step of transcoding the audiovisual content corresponds to a transition from a format compatible with the H.264 standard to a format compatible with the MPEG2 standard.

4. LIST OF FIGURES

The invention will be better understood, and other specific features and advantages will emerge upon reading the following description, the description making reference to the annexed drawings wherein.

5. DETAILED DESCRIPTION OF EMBODIMENTS

Figure 1:
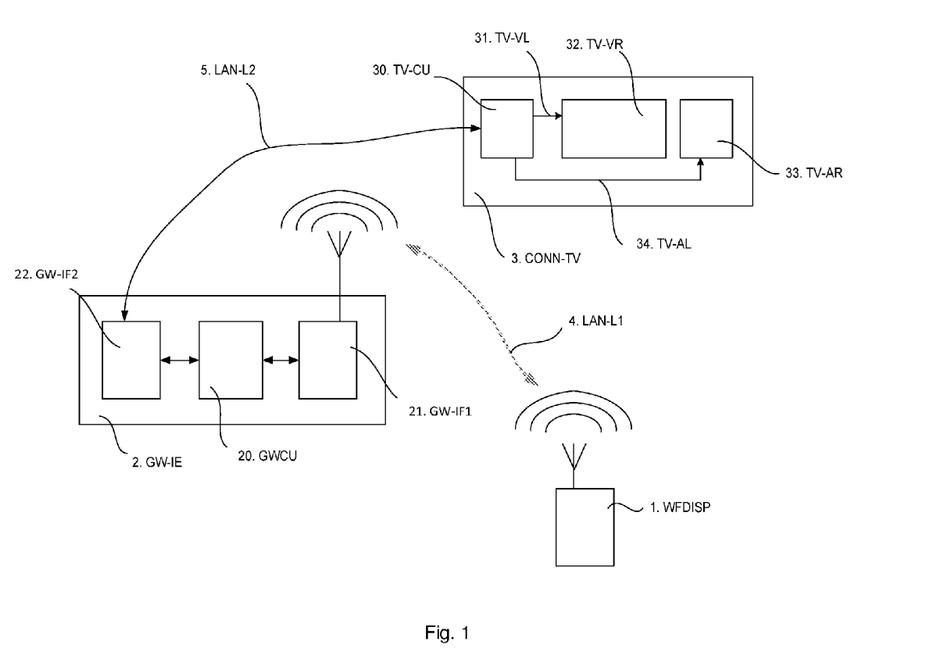
FIG. 1 shows a local network comprising an interconnection device of network gateway type, a connected television set and a smartphone device.
Figure 2:
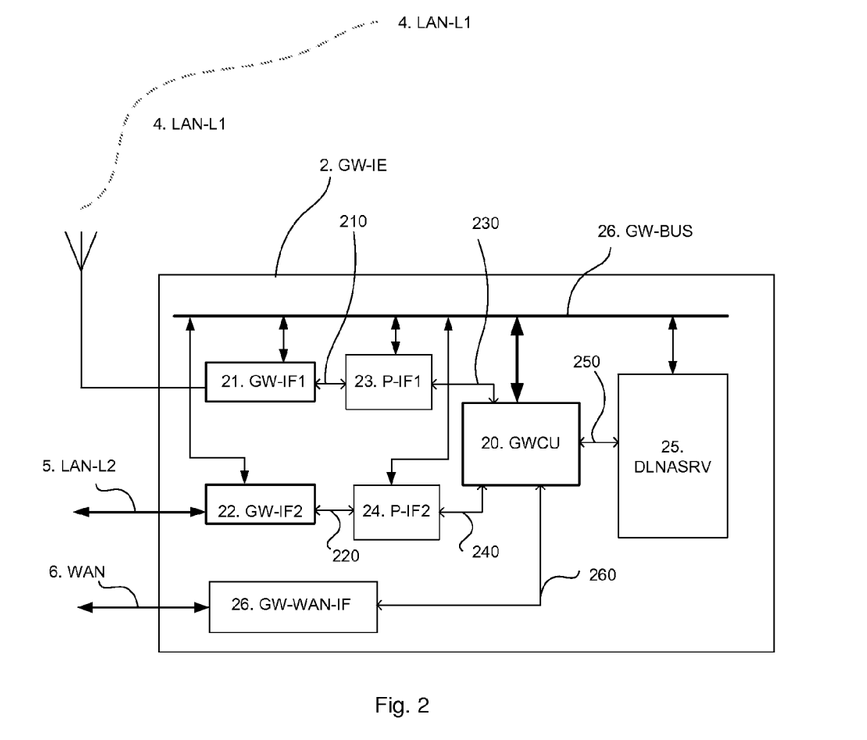
FIG. 2 shows architectural details of the network gateway shown in FIG. 1 and to which are connected the smartphone and the television set of FIG. 1.

In FIGS. 1 to 2, the modules shown are functional units that may or may not correspond to physically distinguishable units. For example, these modules or some of them are grouped together in a single component, or constituted of functions of the same software. On the contrary, according to other embodiments, some modules are composed of separate physical entities.

FIG. 1 shows a local network composed of network paths LAN-L1 4 and LAN-L2 5 comprising an interconnection device of network gateway type GW-IE 2, a connected television set CONN-TV 3 and a portable smartphone device WFDISP 1.

The portable smartphone device WFDISP 1 is compatible with the WiFi Display standard, whose trade name is Miracast. The smartphone, which is configured to implement mobile telephony, geo-location, content reception, video and audio recording and mass storage functions, comprises a display screen and a sound reproduction device. The device WFDISP 1 is further configured to transmit an item of audiovisual content to a WiFi Display compatible reproduction device via the intermediary of their respective wireless communication interfaces. The feature therefore makes it possible to forward the display of the device WFDISP 1 to a WiFi Display compatible television set.

The television set CONN-TV 3 is a reproduction device of connected television set type which comprises an interface for connection to a LAN local network. According to the embodiment of the invention, the interface is of Ethernet type and comprised in a control unit module TV-CU 30 of the television set CONN-TV 3. The television set CONN-TV 3 does not have a wireless connection interface and is also not intrinsically compatible with a display forwarding technology for wireless mobile devices, such as, for example, WiFi Display.

According to the presented embodiment of the invention, the network gateway, works as a proxy device in the implementation of the WiFi Display function for the local network (home network or otherwise) which is connected thereto (network paths LAN-L1 4 and LAN-L2 5). The network gateway is built around a standard architecture of this type of equipment. A control unit GWCU 20 comprises all the elements useful for the implementation of the functions of network switch, router and bridge. The gateway further comprises a WAN (Wide Area Network) network interface, a wireless local network interface GW-IF1 21 and a wired local network interface GW-IF2 22. The wireless communication interface GW-IF1 is compatible with wireless communication standard IEEE802.11-2012. The control unit of the network gateway GW-IE 2 comprises all elements useful for the implementation of the functions specific to its use and notably a microcontroller, non-volatile storage memory of FLASH type, working memory of random access memory type for executing embedded software and backing up system contexts, a power supply circuit, clock circuits, a router/bridge circuit comprising a plurality of connection ports and a modulation/demodulation circuit useful for connection to a WAN network, among others. However, not all of these elements are shown and described, their description not being necessary for the understanding of the invention. The wireless connection interface GW-IF1 comprises an antenna contributing to the quality of the connections established via the intermediary of the network path LAN-L1 4, which implements wireless connections.

The connected television set CONN-TV 3 is connected to the network gateway GW-IE 2 which acts as an interconnection device for a local network. A connection compatible with the Ethernet standard is used for the implementation of the wired network path LAN-L2 5, according to the presented embodiment of the invention. The television set device, useful for the reproduction of audiovisual content, comprises a set of modules useful for the implementation of the functions of a television set, not shown here, as not being necessary for the understanding of the invention. The television set comprises a control unit TV-CU 30 which notably comprises a microcontroller, non-volatile storage memory of FLASH type, working memory of random access memory type for executing embedded software and backing up system contexts, a power supply circuit, clock circuits, a demultiplexer, an audio/video decoder compatible with the MPEG 2 standard, a reception interface for digital terrestrial television and an Ethernet interface for the reception of content from a LAN network. The Ethernet interface is comprised in the control unit TV-CU 30 and is connected to the wired network path LAN-L2 of the local LAN network whose management is carried out by the network gateway (router/gateway) GW-IE 2. The television set CONN-TV 3 is compatible with the UPnP/DLNA interoperability standard which makes it possible to reproduce an item of content stored on another device connected to a same LAN network, under control of a controller module compatible with UPnP/DLNA.

The communication interface GW-IF1 of the network gateway GW-IE 2 is configured to enable communication with the portable device of smartphone type WFDISP 1.

According to the invention, the gateway GW-IE 2 cleverly transmits information elements IE as defined according to the WiFi Display standard and which aim to inform a connected remote device of capabilities of the device which transmits these information elements IE.

The WiFi Display standard indicates that, to be recognised (or detected) as being a WiFi Display compatible device, IEs (Information Elements) must be correspondingly inserted into the WiFi MAC frames.

The IEs are described by the WiFi Display standard and are in correlation with the characteristics of the device concerned, that is to say the transmitter device.

Thus, and according to the presented embodiment of the invention, the router gateway indicates, by specifying the information elements embedded in the beacon frames, that it is a display device and indicates the model, the decoding capabilities and the supported display resolutions, for example. The gateway previously obtained these items of information by reading via one or more bidirectional links linking it to reproduction devices having the corresponding characteristics.

Also, and if the gateway is connected to a plurality of reproduction devices, it will be able to indicate in the transmitted information elements IE that it is several "virtual" (as emulated) reproduction devices at the same time, so that a remote connected device receiving the IEs, such as a smartphone, or a tablet, for example, can offer its user a direct peer-to-peer wireless connection, with one or other of the stated devices with a view to carrying out a display forwarding. The user may thus make a choice.

According to the presented embodiment of the invention, IEs are inserted into management packets of the MAC layer, such as beacon, probe request or probe response packets, for example, making it possible to present the gateway GW-IE 2 as being a reproduction device compatible with the WiFi Display standard, even if this is not in reality a reproduction device. According to the presented embodiment of the invention, the gateway GW-IE 2 does not in fact comprise an audiovisual reproduction device other than indicators of light emitting diode type or an LCD control screen, for example. According to the presented embodiment of the invention, the gateway GW-IE 2 has no display screen adapted to the reproduction of an item of audiovisual content such as a film, images or photographs, for example.

The gateway GW-IE 2 nevertheless comprises a server adapted to broadcast and share content between the items of equipment connected to the LAN network constituted of network paths LAN-L1 4 and LAN-L2 5. This server, embedded in the network gateway GW-IE, is compatible with the widespread UPnP/DLNA interoperability standard used in recent home (residential or business) local networks. Thus, the gateway can perform Digital Media Controller (DMC) functions and detect the connected television set CONN-TV 3 as being a Digital Media Renderer (DMR), the television set CONN-TV 3 also being for its part compatible with the UPnP/DLNA interoperability standard. The gateway is thus configured to operate as a digital media and audiovisual content server compatible with the UPnP/DLNA interoperability standard and to control the reproduction of an item of content stored in a storage memory module which is internal thereto, by the connected television set CONN-TV 3. The wired Ethernet link LAN-L2 acting as a connection between a media server and a reproduction device in the sense of the DLNA interoperability standard. In other words, the LAN link LAN-L2 performs a DLNA connection.

Also, and according to the invention, the network gateway GW-IE 2 is configured to perform the Digital Media Controller (DMC) functions as defined in the UPnP/DLNA standard. The network gateway GW-IE 2 is further configured to have WiFi display service (sink) functions on the wireless LAN network LAN-L1 4 and partially perform Digital Media Server (DMS) functions as defined in the UPnP/DLNA standard. Advantageously, and due to the transmission of information elements IE as defined in the WiFi Display standard to the wireless network LAN-L1 4, the network gateway GW-IE 2, compatible with the UPnP/DLNA interoperability standard, is configured to perform the function of relay (or proxy) in the implementation of the function of display forwarding between the WiFi Display compatible portable smartphone device WFDISP 1 and the reproduction device of television set type CONN-TV 3, which is not WiFi Display compatible, natively.

Due to the transmission of information elements IE, by the network gateway GW-IE 2, the portable device WFDISP 1 sees the gateway as a WiFi Display compatible audiovisual content reproduction device, even if it does not constitute one in itself.

The portable device WFDISP 1 is thus able to be configured to enable its user to transmit data frames coding an item of audiovisual content which is stored or received from an external source, with a view to its reproduction on a remote device. The gateway device receives these frames via the intermediary of its interface for connection to the LAN network GW-IF1 and transmits the audiovisual content to the connected television set CONN-TV 3 by the implementation of UPnP/DLNA server functions. The connected television set then receives data corresponding to the content, under control of the network gateway GW-IE 2 and reproduces the audiovisual content transmitted by the portable device WFDISP 1 via the intermediary of the gateway GW-IE 2 cleverly passing itself off as a reproduction device compatible with the WiFi Display standard. The television set CONN-TV 3 uses embedded devices TV-VR 32 and TV-AR 33 with a view to reproducing respectively the video and audio components of the audiovisual content received from the device WFDISP 1 via the intermediary of the gateway GW-IE 2.

The gateway GW-IE 2 is further adapted for adaptation of the format of data coding the audiovisual content and/or for transcoding. For example, the data sent by the use of functions implemented according to the UPnP/DLNA interoperability standard is not necessarily identical to the format of the data received in the data frames by the interface GW-IF1 from the portable device WFDISP 1. Furthermore, if the data are transmitted directly in frames of the link layer between the portable device WFDISP 1 and the network gateway GW-IE 2 in, for example, an H.264 content coding format, the gateway is adapted to convert the data in order to code the transferred audiovisual content according to the MPEG 2 standard, for example. The set of operations useful for format conversion, adaptation and/or transcoding are carried out under control of the control unit of the network gateway and using adapted processing modules.

FIG. 2 shows architectural details of the gateway GW-IE 2 to which are connected the smartphone WFDISP 1 and the connected television set CONN-TV 3. The control unit GWCU 20 comprises a microcontroller associated with a random access memory and a non-volatile memory configured to execute embedded software routines. The embedded software routines, when they are executed, implement the set of functions supported by the gateway, and notably the functions of network bridge, of network router, of network switch, of interface for a wireless network, of Ethernet interface, of notification to the user, of configuration page generation enabling the configuration of certain options using a computer connected to a port of the gateway, and the UPnP/DLNA server functions and the controller functions associated with the UPnP/DLNA server functions. The control unit GWCU 20 is connected to a controller and server module DLNASRV 25 which carries out processing operations specific to the UPnP/DLNA interoperability functions. The control unit is connected to the module DLNASRV 25 by a bidirectional control and data bus 250. The control unit GWCU 20 is also connected to the first interface GW-IF1 21, the wireless communication interface, via the intermediary of a processing module P-IF1 23 and buses 210 and 230, which processing module is configured to carry out operations such as buffering, adaptation between the link layer and the transport layer, and vice versa, for example. The processing module P-IF1 23 is dynamically configured, under control of the control unit GWCU 20. The control unit GWCU 20 is also connected to the second communication interface GW-IF2 22 via the intermediary of a processing module P-IF2 24 and internal buses 220 and 240. The processing module P-IF2 24 performs operations similar to those performed by the processing module P-IF1 23. The control unit GWCU 20 comprises routing and bridge circuits which, when they are configured, carry out routings provided according to the current configuration between the various interfaces and the various ports of the network gateway GW-IE.

The network gateway comprises a third interface GW-WAN-IF 26 which enables the connection to a broadband network via the intermediary of a communication line of ADSL type. The line is, for example, a subscriber line enabling the connection of a home to a broadband network such as the internet, for example. The line is shown by the network branch WAN 6. An internal bus 260 carries out the exchanges of data between the interface module GW-WAN-IF 26 and the control unit GW-WAN-IF. A high-speed internal bus GW-BUS 26 further enables exchanges of protocol data or direct memory access (DMA) between the various main modules stated above which constitute the network gateway GW-IE 2.

The control unit GWCU 20, under control of the embedded software which is executed, configures the processing module P-IF1 23 to repeatedly insert data of information element IE type as defined in the WiFi Display standard into the adapted fields of the MAC layer of the interface GW-IF1 so that the corresponding frames, when they are broadcast over the path LAN-L1 4 of the local LAN network managed by the gateway GW-IE 2, enable a connected device to perceive (or to detect) the gateway as being a reproduction device compatible with the WiFi Display display forwarding standard, in addition to its function as network access point. These information elements IEs are transmitted, for example, in beacon frame fields, according to the embodiment. According to a variant, these information elements are transmitted in dedicated frames defined in a revision of the WiFi Display standard.

According to the embodiment of the invention, the portable device WFDISP 1, natively compatible with the display forwarding standard called WiFi Display, can forward or duplicate its display on the connected television set CONN-TV 3, it being incompatible, by proceeding as follows:

When the gateway GW-IE 2 transmits information elements, these elements are received by the portable device of smartphone type WFDISP 1, connected to the gateway by the wireless link LAN-L1 4. The device WFDISP 1 then makes available to its user the function for display forwarding to a nearby compatible device, a function announced as a result of the reception of WiFi Display compatible information elements IE, which are transmitted by the in this case allegedly compatible gateway. The user can then choose to activate, by simple operation at the man-machine interface of his smartphone WFDISP 1, display forwarding. The data frames defined in a link layer of a wireless network protocol and coding an item of audiovisual content are then transmitted over the network path LAN-L1 and received by the wireless communication interface GW-IF1 of the gateway GW-IE 2, before being stored in a buffer memory in the processing module P-IF1 23 then processed by the control unit GWCU 1 which comprises adaptation means and transcoding means making it possible to retransmit the content received in the form of data streams or one or more files to the processing module P-IF2 and the second interface GW-IF2. The audiovisual content received from the device WFDISP 1 is then transmitted via the intermediary of the second communication interface GW-IF2, and by the use of sharing functions specific to the UPnP/DLNA interoperability protocol. The control and processing module DLNASRV 25 operates in conjunction with the control unit GWCU 1 to implement the UPnP/DLNA protocol, and notably the controller and server function, in addition to the function of storing data in one or more data formats compatible with content sharing.

The connected television set CONN-TV 3 receives data frames or packets, or a continuous stream of data, according to the transmission mode defined by the UPnP/DLNA standard. An Ethernet interface comprised in the control unit TV-CU 30 of the television set CONN-TV 3 transmits the data received to a processing module comprising notably an audio and video decoding module making it possible to transmit one or more video components to the video reproduction module TV-VR 32 and one or more audio components to the audio reproduction module TV-AR 33. The audiovisual content stored or received by the portable smartphone device WFDISP 1 which uses its display forwarding function compatible with the WiFi Display standard is then reproduced by the connected television set CONN-TV 3, despite being incompatible with the standard, via the intermediary of the network gateway cleverly perceived as being a reproduction device, as it transmits, for this purpose, information elements as defined in the WiFi Display standard.

In other words, the gateway GW-IE 2 performs interconnection device functions for the local LAN network constituted of paths LAN-L1 and LAN-L2 5, respectively connected to the first interface GW-IF1 and to the second interface GW-IF2. The first interface GW-IF1 is adapted for the implementation of wireless communication, according to standard IEEE802.11-2012, for example; the second interface GW-IF2 is adapted for the transmission of content and therefore for content sharing, as defined in the interoperability standard for local UPnP/DLNA networks. The network gateway GW-IE 2 is configured to transmit information elements IE aiming to enable it to be detected by a remote equipment, such as, for example, the smartphone WFDISP 1, as being compatible with a function for reproduction according to WiFi Display, using an interface for connection to the wireless network LAN-L1. The gateway is adapted to receive data frames defined in a link layer of a wireless network protocol, notably with data coding an item of audiovisual content, in H.264 format, for example. The data are thus received from the remote device WFDISP, which is connected to the first interface GW-IF1 of the gateway, by means of a wireless connection. The gateway is also configured to, on reception of data frames, or after adaptation of format and any audio and/or video transcoding, transmit the audiovisual content received from the smartphone WFDISP 1 to its second interface GW-IF2, so that the content received from the device WFDISP 1 is reproduced by the connected television set CONN-TV 3 connected to the second interface GW-IF2.

Functions defined in the UPnP/DLNA interoperability standard are used for the transmission of data from the gateway and to the connected television set, if relevant.

The device WFDISP 1 uses the MAC link layer (layer 2 of the OSI model) for the transmission of data frames to the gateway.

The method enabling the gateway to pass itself off cleverly, in addition to its main function of network gateway, as a WiFi Display reproduction device comprises the following steps:

transmission by the interface GW-IF1 of at least one information element aiming to enable it to be detected by a remote item of equipment such as the smartphone WFDISP 1 as being compatible with a function for reproduction using a wireless connection interface, such as GW-IF1 (that is to say a display forwarding function), reception of data frames transmitted at the MAC layer, the data frames comprising data coding an item of audiovisual content and being received from the smartphone WFDISP 1 by means of the wireless connection LAN-L1 4, immediate or deferred transmission of the content received in the MAC frames received from the smartphone, to the GW-IF2 interface (and therefore the network path LAN-L2 5, so that the content received is displayed by the connected television set CONN-TV 3, connected to the gateway by the Ethernet link LAN-L2 5), using, for example, the UPnP/DLNA interoperability protocol.

Figure 3:
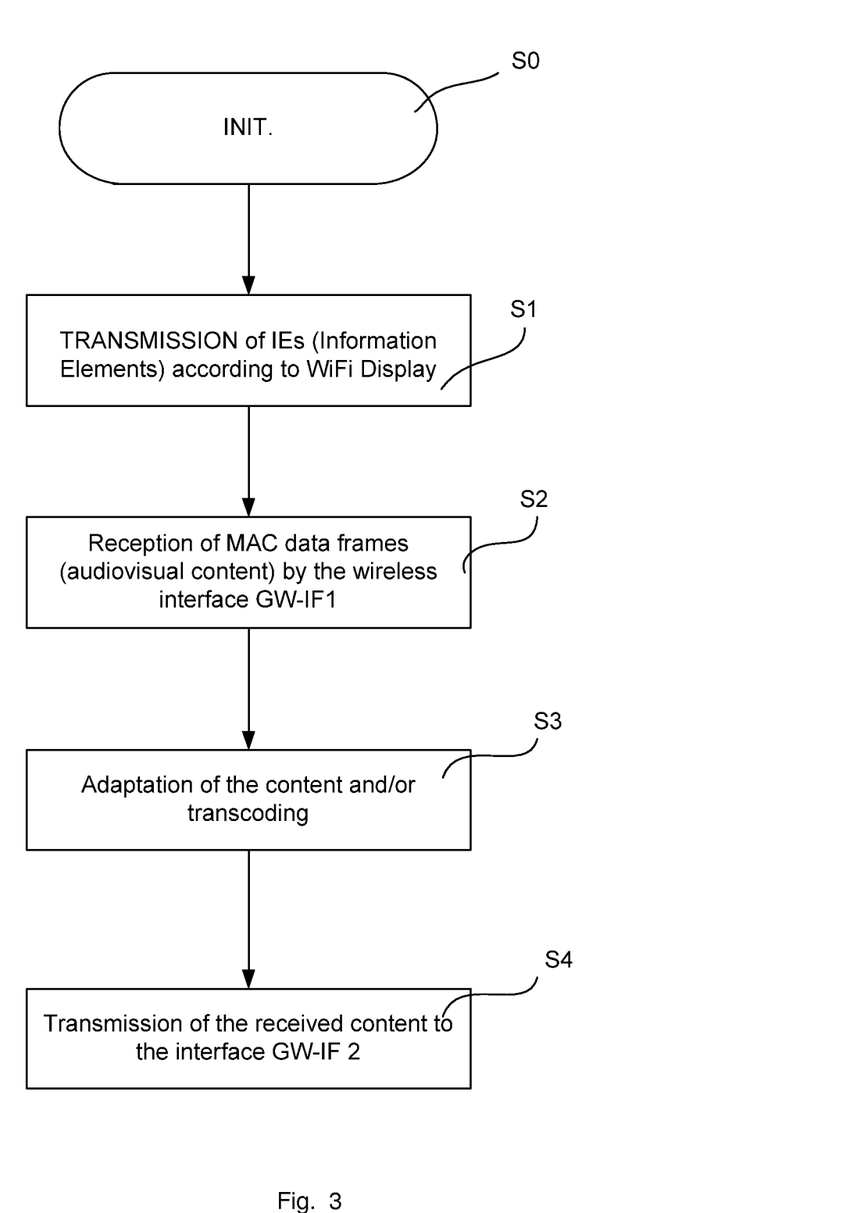
FIG. 3 is a functional diagram showing an interconnection and content transmission method according to the invention.

FIG. 3 is a functional diagram which shows the method for interconnection of a WiFi Display compatible device with a device which is not WiFi Display compatible, via the intermediary of the network gateway LAN GW-IE 2 which cleverly seems like an item of WiFi Display compatible equipment by transmitting information elements IE in beacon frames transmitted to the device connected to the wireless interface GW-IF1.

Step S0 corresponds to the initialisation and the global configuration of the network gateway, following its being switched on. The control unit of the gateway copies to the random access memory and executes the embedded software routines initially stored in the non-volatile memory. The execution of the software routines enables the configuration of all circuits and their registers, useful for the implementation of the functions of the gateway. At the end of step S0, the gateway is configured and operates as a modem-router making it possible, among other things, to interconnect the network WAN 6 connected to the interface GW-WAN-IF 26 with the LAN local network, constituted of LAN network paths LAN-L1 4 and LAN-L2 5. The gateway also acts on the LAN network as a UPnP/DLNA server and controller enabling the user to share content between devices connected to the LAN network. The set of modules described above are configured and operational. In step S1, under control of the control unit GWCU 20, the processing module P-IF1 23 insert information elements IE indicating that the gateway is a reproduction device capable of receiving an item of audiovisual content in MAC frames transmitted to the interface GW-IF1 21 over the wireless network LAN-L1. The remote, connected device WFDISP 1, consequently detects these items of information and, under control of the user, initiates the transfer of an item of audiovisual content to the wireless network interface of the gateway. In step S2, the gateway receives the frames transmitted by the remote device WFDISP 1 and saves them temporarily in a buffer memory of the processing module P-IF1 23. The processing module provides notification of the arrival of the frames to the control unit GWCU 20 which scans the buffer memory P-IF1 and detects the type of coding used for the data coding the audiovisual content being received.

In step S3, the control unit carries out, in conjunction with the processing module P-IF1 23 and the processing module P-IF2 24, and with the server DLNASRV 25, the preparation of the data prior to the transmission thereof to the connected reproduction device CONN-TV 3. The control unit GWCU 20 has previously determined which were the audio and video coding formats supported in reception by the reproduction device CONN-TV 3, such as, for example, a video coding format MPEG 2. In the case where the coding of the audio and video components used in the frames transmitted by the device WFDISP 1 corresponds to the coding used by the reproduction device CONN-TV 3, the transcoding of the components is not necessary. Step S3 thus possibly corresponds to an adaptation of the format of the data for transport. Step S4 corresponds to the transmission of the prepared data to the interface GW-IF2, itself connected to the Ethernet interface of the control unit TV-CU of the television set CONN-TV 3. The control unit TV-CU 30 processes the data on arrival and transfers the data to the audio and video reproduction modules TV-AR 33 and TV-VR 32 of the television set CONN-TV 3. The content available on the portable device WFDISP 1 whose display has been forwarded and/or duplicated is reproduced on the reproduction device CONN-TV 3. The gateway acts as a relay of proxy type in content transmission according to the WiFi Display standard. An important advantage of this method is that it does not require acquisition of a new equipment. Moreover, an old network gateway can potentially by updated from point of view of its embedded software and thus comprise software routines which, executed, enable the insertion of appropriate information elements IE. With this method according to the invention, it is not necessary to use a dongle enabling WiFi Display reception transmitting the audiovisual content received over an HDMI interface to the television set CONN-TV 3, for example, such as exists according to the prior art.

Naturally, the invention is not limited to the emulation of a compatibility with the WiFi Display display forwarding protocol, but also applies to any other display forwarding protocol whose presence can be indicated to third-party equipment connected to the local network by insertion of information elements intended for this purpose. Furthermore, neither is the invention limited to a gateway adapted to audiovisual content sharing over a local UPnP/DLNA network, but also applies to any interoperability protocol enabling the connected television set CONN-TV 3 to reproduce an item of content under control of the gateway using a wired (therefore not WiFi Display compatible) input interface.

Finally, the invention is not limited to a network gateway but also applies to any interconnection device for a local network having a first, wireless, connection interface capable of transmitting information elements (IE) indicating a compatibility with a display forwarding function and of receiving an item of audiovisual content encoded and transmitted by frames embedded in a link layer of a network protocol and a second interface adapted to content sharing by implementation of an interoperability protocol and able to retransmit the content received (over the first interface) with a view to a reproduction on a display device connected to the second interface.

The invention claimed is:

1. An interconnection device comprising:
    a first communication interface configured to communicate wirelessly over a local area network;
    a second communication interface configured to share content over the local area network in accordance with an interoperability protocol for local area networks;
    control circuitry configured to:
        transmit, via the first communication interface using wireless communication to a first remote device, at least one information element to enable said interconnection device otherwise incompatible with a function for audiovisual reproduction to be detected by a first remote device as an audiovisual content reproduction device that is compatible with a function for reproduction using a wireless communication interface, said interconnection device acting as a proxy for a second device communicatively connected over the local area network to the second communication interface of the interconnection device;
        receive, from said first remote device using wireless communication via the first communication interface, data frames defined in a link layer of a wireless network protocol, said data frames comprising data representing audiovisual content; and
        transmit, via the second communication interface, said audiovisual content to said second device, wherein the second device is configured to reproduce said audiovisual content by an implementation of functions defined in said interoperability protocol adapted to sharing content with equipment connected to a same local area network, and wherein said interconnection device facilitates a transfer of audiovisual content between the first remote device and the second device, which are both otherwise incompatible for realizing said transfer directly therebetween.

2. The interconnection device according to claim 1 wherein said interoperability protocol for local area networks is defined according to an UPnP/DLNA standard.

3. The interconnection device according to claim 1 wherein said link layer of the wireless network protocol is a MAC layer.

4. The interconnection device according to claim 1, wherein said at least one information element for detection of said interconnection device by the first remote device is defined in a features declaration service comprised in a peer-to-peer wireless communication standard.

5. The interconnection device according to claim 1, wherein said at least one information element for detection of said interconnection device by the first remote device is an information element IE of a MAC network layer, as defined in a peer-to-peer wireless communication standard.

6. The interconnection device according to claim 1, wherein said function for reproduction using a wireless connection interface is defined in a standard for display forwarding via a wireless communication interface.

7. The interconnection device according to claim 1, wherein said control circuitry is configured to transmit said audiovisual content by adapting a format of the data frames and/or transcoding said audiovisual content.

8. The interconnection device according to claim 7, wherein the adapting of the format of the data frames is configured as a transition from a format compatible with a standard for display forwarding via a wireless communication interface to a format compatible with an UPnP/DLNA standard.

9. The interconnection device according to claim 7, wherein the transcoding of said audiovisual content is configured as a transition from a format compatible with an H.264 standard to a format compatible with an MPEG2 standard.

10. An interconnection method to be performed in a network gateway comprising both a first communication interface configured to communicate wirelessly over a local area network and a second communication interface configured to share content over the local area network in accordance with an interoperability protocol for local area networks, said method comprising:
transmitting, by the first communication interface of the network gateway using wireless communication, at least one information element to enable said network gateway otherwise incompatible with a function for audiovisual reproduction to be detected by a first remote device as an audiovisual content reproduction device that is compatible with a function for reproduction using a wireless connection interface, said interconnection device network gateway acting as a proxy for a second device communicatively connected over the local area network to the second communication interface of the network gateway;
receiving, from said first remote device using wireless communication by the first communication interface, data frames defined in a link layer of a wireless network protocol, said data frames comprising data representing audiovisual content; and
transmitting, by the second communication interface of said network gateway, said audiovisual content to said second device, wherein the second device is configured to reproduce said audiovisual content, by an implementation of functions defined in said interoperability protocol adapted to share content with equipment connected to a same local area network, and wherein said network gateway facilitates a transfer of audiovisual content between the first remote device and the second device, which are both otherwise incompatible for realizing said transfer directly therebetween.

11. The interconnection method according to claim 10, wherein said interoperability protocol for local area networks is defined according to an UPnP/DLNA standard.

12. The interconnection method according to claim 10, wherein said link layer of the wireless network protocol is a MAC layer and that said information element for detection of said network gateway by the remote equipment as being compatible with the function for reproduction using the wireless connection interface is defined in a features declaration service comprised in a peer-to-peer wireless communication standard.

13. The interconnection method according to claim 10, wherein said function for reproduction using the wireless connection interface is defined in a standard for display forwarding via a wireless communication interface.

14. The interconnection method according to claim 10, wherein the transmitting of said content further comprises adapting a format of the data frames and/or transcoding said audiovisual content.

15. The interconnection method according to claim 14, wherein the adapting of the format of the data frames corresponds to a transition from a format compatible with a standard for display forwarding via a wireless communication interface to a format compatible with an UPnP/DLNA standard.

16. The interconnection method according to claim 14, wherein the transcoding of said audiovisual content corresponds to a transition from a format compatible with an H.264 standard to a format compatible with an MPEG2 standard.

17. An interconnection device comprising:
a first communication interface configured to communicate wirelessly over a local area network;
a second communication interface configured to share content over the local area network in accordance with an interoperability protocol for local area networks;
control circuitry configured to:
transmit, via the first communication interface using wireless communication to a first remote device, at least one information element to enable said interconnection device otherwise incompatible with a function for reproduction to be detected by a first remote device as an audiovisual content reproduction device that is compatible with a function for reproduction using a wireless connection interface, said interconnection device acting as a proxy for a second device communicatively connected over the local area network to the second communication interface of the interconnection device;
receive, from said first remote device using wireless communication via the first communication interface, data frames defined in a link layer of a wireless network protocol, said data frames comprising data representing audiovisual content; and transmit, via the second communication interface, said audiovisual content to said second device, wherein the second device is configured to reproduce said audiovisual content by an implementation of functions defined in said interoperability protocol adapted to sharing content with equipment connected to a same local area network, and wherein said interconnection device facilitates a transfer of audiovisual content between the first remote device and the second device, which are both otherwise incompatible for realizing said transfer directly therebetween, wherein said at least one information element for detection of said interconnection device by the first remote device is an information element IE of a MAC network layer, as defined in a peer-to-peer wireless communication standard.

\* \* \* \* \*